(12) United States Patent
Ravishankar et al.

(10) Patent No.: US 11,023,139 B2
(45) Date of Patent: Jun. 1, 2021

(54) SYSTEM FOR SPECULATIVE BLOCK IO AGGREGATION TO REDUCE UNEVEN WEARING OF SCMS IN VIRTUALIZED COMPUTE NODE BY OFFLOADING INTENSIVE BLOCK IOS

(71) Applicant: Dell Products L.P., Round Rock, TX (US)

(72) Inventors: K. N. Ravishankar, Bangalore (IN); Parmeshwr Prasad, Bangalore (IN); Smruti Ranjan Debata, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 68 days.

(21) Appl. No.: 16/253,617

(22) Filed: Jan. 22, 2019

(65) Prior Publication Data

US 2020/0233586 A1     Jul. 23, 2020

(51) Int. Cl.
*G06F 12/00* (2006.01)
*G06F 3/06* (2006.01)
*G06F 9/455* (2018.01)

(52) U.S. Cl.
CPC .......... *G06F 3/0616* (2013.01); *G06F 3/0659* (2013.01); *G06F 3/0673* (2013.01); *G06F 9/45558* (2013.01); *G06F 2009/45562* (2013.01)

(58) Field of Classification Search
CPC .... G06F 3/0616; G06F 3/0659; G06F 3/0673; G06F 9/45558; G06F 2009/45562
See application file for complete search history.

(56) References Cited

U.S. PATENT DOCUMENTS

| | | | | |
|---|---|---|---|---|
| 6,000,006 A | * | 12/1999 | Bruce | G06F 11/1068 711/103 |
| 8,621,165 B1 | * | 12/2013 | Sridharan | G06F 11/1435 707/644 |
| 9,588,847 B1 | * | 3/2017 | Natanzon | G06F 16/128 |
| 10,642,747 B1 | * | 5/2020 | Jagtap | G06F 12/10 |
| 2007/0208904 A1 | * | 9/2007 | Hsieh | G11C 16/3495 711/103 |
| 2008/0140918 A1 | * | 6/2008 | Sutardja | G11C 16/349 711/103 |
| 2012/0226962 A1 | * | 9/2012 | Franceschini | G11C 16/349 714/766 |
| 2012/0331247 A1 | * | 12/2012 | Hoobler, III | G06F 11/1458 711/162 |

(Continued)

*Primary Examiner* — Prasith Thammavong
(74) *Attorney, Agent, or Firm* — Jackson Walker L.L.P.

(57) ABSTRACT

An information handling system may include at least one processor and a non-transitory memory coupled to the at least one processor. The information handling system may be configured to implement a disk manager configured to receive a command to perform a block input/output (I/O) job at a first physical storage resource. The disk manager may, based on characteristics of the block I/O job, classify the block I/O job as an intensive write. In response to the block I/O job being classified as an intensive write, the disk manager may invoke a speculative I/O aggregator module of the disk manager. The disk manager may create a delta disk image for the first physical storage resource at a second physical storage resource, and redirect the block I/O job to the delta disk image at the second physical storage resource.

18 Claims, 3 Drawing Sheets

(56) References Cited

U.S. PATENT DOCUMENTS

| | | | |
|---|---|---|---|
| 2013/0086324 A1* | 4/2013 | Soundararajan | G06F 12/0811 711/122 |
| 2013/0145085 A1* | 6/2013 | Yu | G06F 12/0246 711/103 |
| 2013/0179624 A1* | 7/2013 | Lambert | G06F 12/0246 711/103 |
| 2014/0181434 A1* | 6/2014 | Chau | G11C 16/349 711/162 |
| 2014/0201495 A1* | 7/2014 | Hyuseinova | G06F 12/1009 711/207 |
| 2015/0378836 A1* | 12/2015 | Beeken | G06F 11/1469 707/639 |
| 2017/0286285 A1* | 10/2017 | Berke | G06F 12/0868 |
| 2018/0101477 A1* | 4/2018 | Kan | G06F 12/0246 |
| 2019/0303043 A1* | 10/2019 | Charnevich | G06F 3/061 |
| 2020/0150866 A1* | 5/2020 | Satoyama | G06F 3/065 |
| 2020/0285391 A1* | 9/2020 | Sun | G06F 3/064 |
| 2020/0334156 A1* | 10/2020 | Brand | G06F 16/172 |

* cited by examiner

SYSTEM FOR SPECULATIVE BLOCK IO AGGREGATION TO REDUCE UNEVEN WEARING OF SCMS IN VIRTUALIZED COMPUTE NODE BY OFFLOADING INTENSIVE BLOCK IOS

TECHNICAL FIELD

The present disclosure relates in general to information handling systems, and more particularly to systems and methods for reducing uneven wearing of physical storage resources such as storage class memories (SCMs) by offloading intensive block input/output (I/O).

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Non-volatile memory is often implemented in memory modules called non-volatile dual-inline memory modules (NVDIMMs), and NVDIMMs may typically be any of the following types: NVDIMM-N, NVDIMM-F, or NVDIMM-P. These memories bring persistence to the memory channel and can be used in a variety of modes: as a volatile memory, as a load-store byte-addressable memory, or as a block device. While NVDIMM-N is implemented using a volatile memory (e.g., dynamic random access memory or DRAM) upon which a save operation is performed in response to a power failure to transfer data of the volatile memory to non-volatile memory for later recovery, NVDIMM-F and NVDIMM-P devices are non-DRAM based true storage class memories (SCMs) as they offer larger capacities and can be used as storage devices residing on the memory channel.

SCMs are expected to see increased use in coming server generations, as SCMs may bring orders of magnitude of performance improvement over solid-state drives and Non-Volatile Memory Express (NVMe) solutions for enterprise applications. SCMs may enable new usage modes, as an SCM may act as a main system memory, a block device, or a persistent memory device. Although SCMs may bring persistence to the memory channel and a much higher density than the DRAM-based DIMMs, SCMs typically have longer access latencies and lower endurance levels than DRAMs. In some embodiments, a SCM may include a 3D XPoint memory component.

As memory cells in SCMs are repeatedly written, wear-out typically occurs gradually, and either a host controller or an on-DIMM controller may keep track of the number of writes for every block or sector, and resort to higher-level reliability, availability, and serviceability schemes such as wear-leveling for swapping worn out sectors to spares. In some embodiments, health data for a module may be stored in an on-DIMM serial presence detect (SPD) storage location.

Because of the lower endurance and different electrical, thermal, and reliability characteristics than DRAM-based DIMMs, SCM memories are also typically expected to provide visibility on the overall health of the DIMM. A few of the health heuristics that may be provided include the amount of spare memory present, usage of spares beyond a pre-set threshold, number of correctable errors encountered while reading from the media, number of thermal events observed overall, and others. Throughout this disclosure, the example of SCM DIMMs will typically be discussed in detail for the sake of concreteness and clarity of exposition. One of ordinary skill in the art with the benefit of this disclosure will understand that its teachings may also be applied to various other types of physical storage resources.

According to some embodiments, an Address Indirection Table (AIT) may be used to remap a DIMM physical address (DPA) to a particular 3D XPoint Media device address (PDA). Accordingly, the AIT may dynamically allocate an alternate physical location in media as part of a wear-leveling strategy. This extra responsibility apart from I/O redirection may indirectly over-load the AIT.

Particularly in the case of a virtualized environment, extensive block I/O writes may lead to uneven wear leveling of SCMs across all installed DIMMs. Frequent usage of one or more particular SCM DIMMs in a given compute node may lead to a lack of durability for those DIMMs, requiring frequent replacement.

Wear leveling may create events and high-priority alerts, which may lead to undesirable software overhead in Operating System Power Management (OSPM) and other management software. Further, in existing designs, the hypervisor and its management components are typically unaware of the wear leveling requirement of the system.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with existing approaches to uneven wearing of physical storage resources may be reduced or eliminated.

In accordance with embodiments of the present disclosure, an information handling system may include a processor, a memory communicatively coupled to the processor and comprising a plurality of physical storage resources, and a disk manager. The disk manager may be configured to receive a command to perform a block input/output (I/O) job at a first physical storage resource. The disk manager may further be configured to, based on characteristics of the block I/O job, classify the block I/O job as an intensive write. In response to the block I/O job being classified as an intensive write, the disk manager may invoke a speculative I/O aggregator module, create a delta disk image for the first physical storage resource at a second physical storage resource, and redirect the block I/O job to the delta disk image at the second physical storage resource.

In accordance with these and other embodiments of the present disclosure, a method may include, receiving, at a disk manager of an information handling system, a command to perform a block input/output (I/O) job at a first physical storage resource of the information handling system; based on characteristics of the block I/O job, the disk manager classifying the block I/O job as an intensive write; in response to the block I/O job being classified as an intensive write, the disk manager invoking a speculative I/O aggregator module; the disk manager creating a delta disk image for the first physical storage resource at a second physical storage resource; and the disk manager redirecting the block I/O job to the delta disk image at the second physical storage resource.

In accordance with these and other embodiments of the present disclosure, an article of manufacture may include a non-transitory computer-readable medium having computer-executable code thereon that is executable by a processor of an information handling system for implementing a disk manager configured to: receive a command to perform a block input/output (I/O) job at a first physical storage resource; based on characteristics of the block I/O job, classify the block I/O job as an intensive write; in response to the block I/O job being classified as an intensive write, invoke a speculative I/O aggregator module of the disk manager; create a delta disk image for the first physical storage resource at a second physical storage resource; and redirect the block I/O job to the delta disk image at the second physical storage resource.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts. For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

Figure 1:
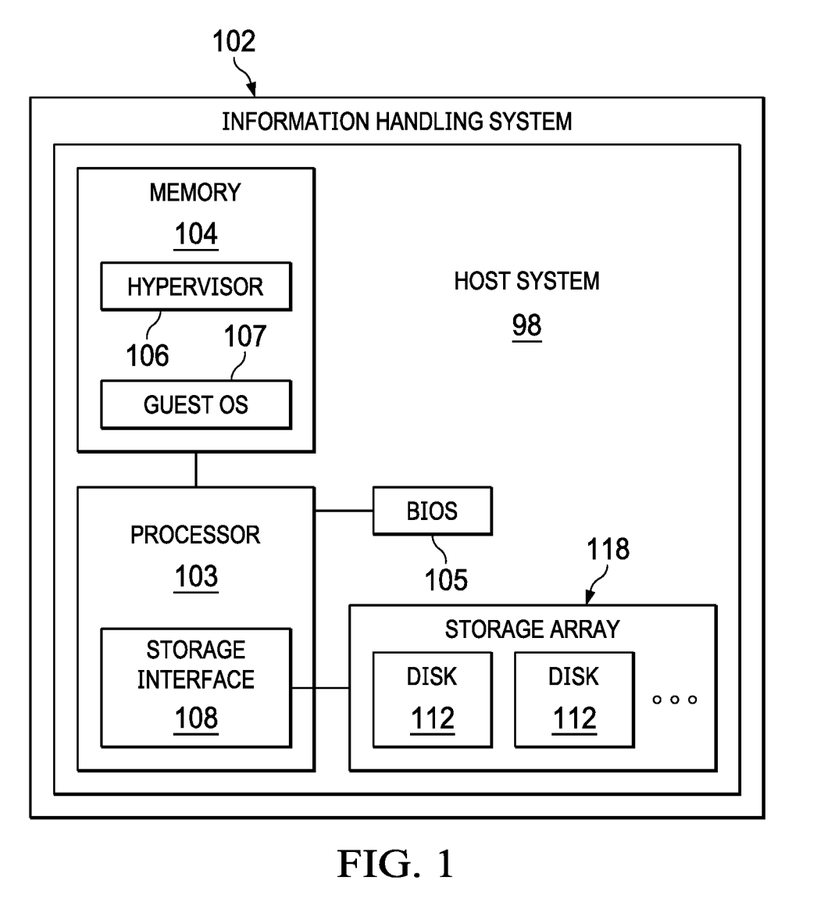
FIG. 1 illustrates a functional block diagram of an example information handling system, in accordance with embodiments of the present disclosure.

FIG. 1 illustrates a block diagram of an example information handling system 102, which may be used to implement part or all of some embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface communicatively coupled to processor 103 (not explicitly shown), and a storage array 118 communicatively coupled via storage interface 108, which may include a plurality of physical storage resources shown as disks 112.

Storage interface 108 may be any system, device, or apparatus configured to manage and/or control storage array 118 and/or disks 112 that make up storage array 118. For example, storage interface 108 may be configured to read data from and/or write data to memory modules comprising disks 112. Additionally or alternatively, storage interface 108 may be configured to refresh memory modules and/or memory chips thereof in embodiments in which disks 112 comprise DRAM. Although storage interface 108 is shown in FIG. 1 as an integral component of processor 103, storage interface 108 may be separate from processor 103 and/or may be an integral portion of another component of information handling system 102 (e.g., storage interface 108 may be integrated into memory 104). In some embodiments, storage interface 108 may comprise a program of executable instructions (or aggregation of programs of executable instructions) configured to manage and/or control storage array 118 and/or disks 112. In some embodiments, disks 112 may be SCM modules such as SCM DIMMs.

In some embodiments, storage interface 108 may implement a disk manager as a module thereof. As discussed in more detail below, a disk manager may include a speculative I/O aggregator module, which may implement various portions of the present disclosure.

In operation, processor 103 and the other elements shown in FIG. 1 may comprise at least a portion of a host system 98 of information handling system 102. In addition to the elements explicitly shown and described, information handling system 102 may include one or more other information handling resources, such as a management controller, etc.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon a hypervisor 106 and one or more guest operating systems (OSes) 107. Hypervisor 106 may comprise software and/or firmware generally operable to allow multiple virtual machines and/or OSes to run on a single computing system (e.g., an information handling system 102) at the same time. This operability is generally allowed via virtualization, a technique for hiding the physical characteristics of computing system resources (e.g., physical hardware of the computing system) from the way in which other systems, applications, or end users interact with those resources. Hypervisor 106 may be one of a variety of proprietary and/or commercially available virtualization platforms, including without limitation, VIRTUALLOGIX VLX FOR EMBEDDED SYSTEMS, IBM's Z/VM, XEN, ORACLE VM, VMWARE's ESX SERVER, L4 MICROKERNEL, TRANGO, MICROSOFT's HYPER-V, SUN's LOGICAL DOMAINS, HITACHI's VIRTAGE, KVM, VMWARE SERVER, VMWARE WORKSTATION, VMWARE FUSION, QEMU, MICROSOFT's VIRTUAL PC and VIRTUAL SERVER, INNOTEK's VIRTUALBOX, and SWSOFT's PARALLELS WORKSTATION and PARALLELS DESKTOP.

In some embodiments, hypervisor 106 may comprise a specially-designed OS with native virtualization capabilities. In another embodiment, a hypervisor 106 may comprise a standard OS with an incorporated virtualization component for performing virtualization.

In yet other embodiments, a hypervisor 106 may comprise a standard OS running alongside a separate virtualization application. In such embodiments, the virtualization application of the hypervisor 106 may be an application running above the OS and interacting with computing system resources only through the OS. Alternatively, the virtualization application of a hypervisor 106 may, on some levels, interact indirectly with computing system resources via the OS, and, on other levels, interact directly with computing system resources (e.g., similar to the way the OS interacts directly with computing system resources, or as firmware running on computing system resources). As a further alternative, the virtualization application of a hypervisor 106 may, on all levels, interact directly with computing system resources (e.g., similar to the way the OS interacts directly with computing system resources, or as firmware running on computing system resources) without utilizing the OS, although still interacting with the OS to coordinate use of computing system resources.

As discussed above, hypervisor 106 may instantiate one or more virtual machines. A virtual machine may comprise any program of executable instructions (or aggregation of programs of executable instructions) configured to execute a guest OS 107 in order to act through or in connection with hypervisor 106 to manage and/or control the allocation and usage of hardware resources such as memory, CPU time, disk space, and input and output devices, and provide an interface between such hardware resources and application programs hosted by the guest OS 107. In some embodiments, a guest OS 107 may be a general-purpose OS such as WINDOWS or LINUX, for example. In other embodiments, a guest OS 107 may comprise a specific-purpose and/or limited-purpose OS, configured so as to perform application-specific functionality (e.g., persistent storage).

Guest OSes 107 may generally comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by guest OSes 107. In addition, guest OSes 107 may include all or a portion of a network stack for network communication via a network interface. Although guest OS 107 is shown in FIG. 1 as stored in memory 104, in some embodiments guest OS 107 may be stored in storage media accessible to processor 103, and active portions of guest OS 107 may be transferred from such storage media to memory 104 for execution by processor 103.

A network interface may comprise one or more suitable systems, apparatuses, or devices operable to serve as an interface between information handling system 102 and one or more other information handling systems via an in-band network and/or an out-of-band network. A network interface may enable information handling system 102 to communicate using any suitable transmission protocol and/or standard. In these and other embodiments, a network interface may comprise a network interface card, or "NIC." In these and other embodiments, a network interface may be enabled as a local area network (LAN)-on-motherboard (LOM) card.

Figure 2:
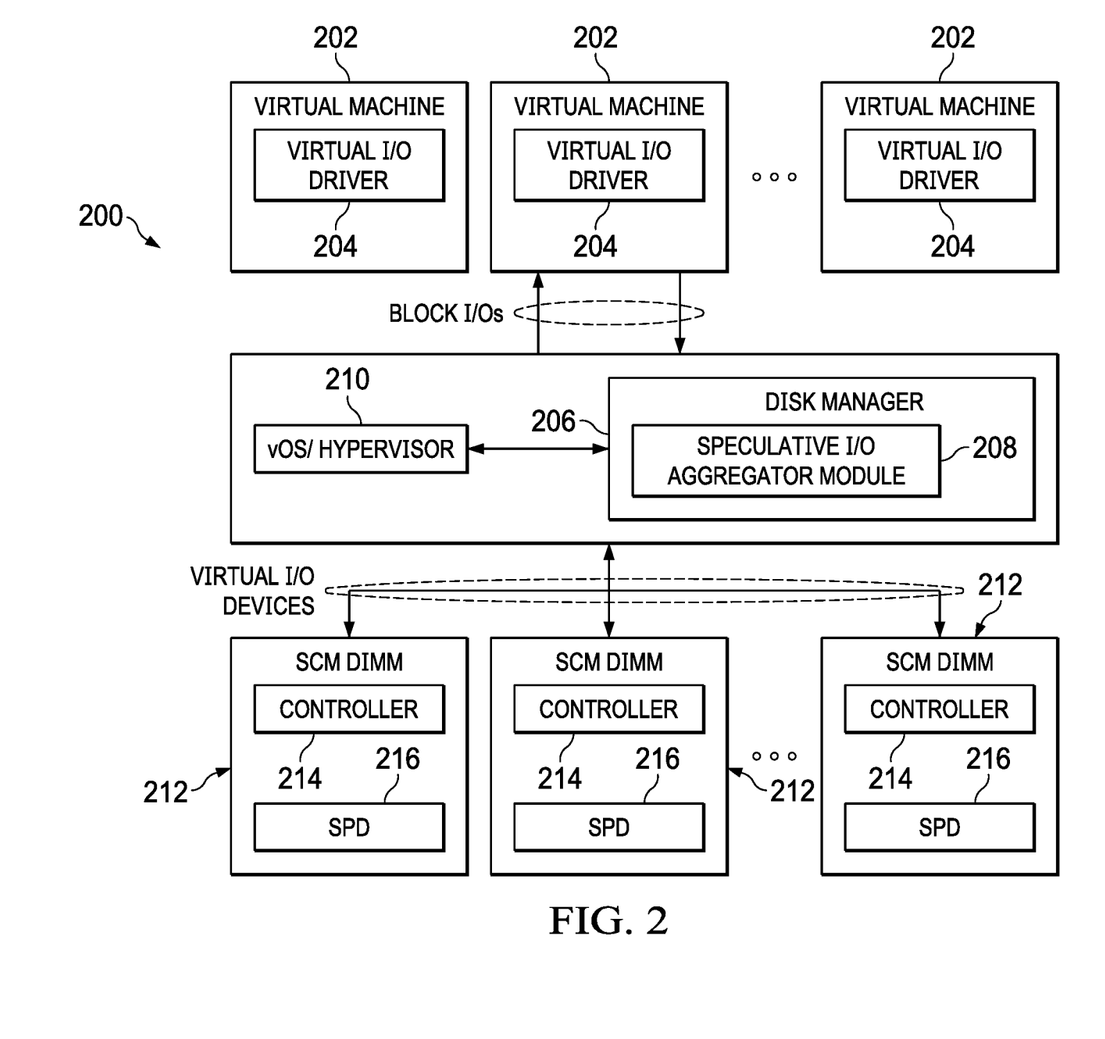
FIG. 2 illustrates a functional block diagram of a disk manager, in accordance with embodiments of the present disclosure.

Turning now to FIG. 2, a block diagram of system 200 is shown. In some embodiments, system 200 may be implemented on one or more information handling systems 102 as shown in FIG. 1. In operation, a plurality of virtual machines 202 are configured to issue I/O commands (e.g., block I/O commands) via their respective virtual I/O drivers 204.

These I/O commands are communicated to disk manager 206 executing on either a virtualized OS (vOS) or a hypervisor 210. As discussed above, disk manager 206 may be implemented as a component of a storage interface 108.

Disk manager 206 may communicate the I/O commands to a plurality of virtual I/O devices for completion. As shown, the virtual I/O devices may be implemented via a plurality of physical storage resources such as SCM DIMMs 212. In this embodiment, each SCM DIMM 212 may include an on-DIMM controller 214, as well as an SPD 216 for storing data that may include information regarding wear leveling, available space, the number of times blocks have been written, total amount of data that has been written, total capacity, etc. for the respective SCM DIMMs. Such data may be generally referred to collectively herein as "health data" for a respective SCM DIMM.

Information in SPDs 216 may be periodically queried by disk manager 206. In some embodiments, at least a portion of such data may be queried whenever information handling system 102 is powered on. In other embodiments, such data may be queried periodically or at any desired intervals.

It may be the case that a particular one of virtual machines 202 may require particularly intensive I/O, such as a large amount of data to be written by disk manager 206. The determination of whether an I/O command is classified as "intensive" may be based on a variety of factors, as one of ordinary skill in the art with the benefit of this disclosure will readily understand. For example, a particular block I/O job may be classified as intensive if the number of bytes or blocks to be written is above a selected threshold, if the number of bytes or blocks to be written per unit time is above a selected threshold, etc. In some embodiments, the determination of whether a job is classified as intensive may be based in part on the health data of the physical storage resource to which the job is directed. For example, if that physical storage resource has already received a particularly high number of writes over its lifetime, then a relatively smaller amount of data being written in a particular I/O job might still be classified as intensive.

As shown in FIG. 2, disk manager 206 may implement a speculative I/O aggregator module 208, which may speculatively determine that a particular SCM DIMM should have write I/O redirected elsewhere. In operation, speculative I/O aggregator module 208 may perform remapping of memory addresses which are frequently accessed (e.g., which may be inferred from data on SPDs 216 and any other health data accessible to vOS/hypervisor 210) by virtual machines 202.

Such remapping may in some embodiments be accomplished through the creation of a delta disk image (DDI) for a particular SCM DIMM. The DDI may be used as a receptacle for intensive writes that were originally destined for a SCM DIMM 212 that, for example, already has health data indicating that a failure may occur soon. The DDI for an original SCM DIMM may store information that is a "delta" relative to that original SCM DIMM. For example, if the original SCM DIMM contains data A, and new data to be written includes data B, then the delta disk image may be written as DDI=A$\oplus$B (where $\oplus$ denotes the XOR operation).

Further, disk manager 206 may also write newly created delta disk meta-information to a Platform Configuration Data (PCD) region of the SCM DIMM on which the DDI is created.

Thus, the use of a DDI may assist with wear leveling, reduce uneven usage, and extend the lifetime of SCM DIMMs 212.

In some embodiments, the creation and use of a delta disk image may be implemented via some or all of the following steps.

1) The vOS or hypervisor 210 may receive health data such as wear leveling information, available space, total capacity, etc. on every power cycle from each available SCM DIMM.

2) The vOS or hypervisor 210 may receive memory SPD information from all SCM DIMMs at defined intervals to compute the internal changes in the SCM DIMM (e.g., including correctable and uncorrectable errors, iMC, fault isolation, MCB, etc.).

3) Any block I/O job of type JOB TYPE COMMIT may be bifurcated to a child block job, wherein the child job is assigned to speculative I/O aggregator module 208. Later, it may be the duty of speculative I/O aggregator module 208 to monitor virtio_blk_rw_complete for completion.

4) Block I/O completion may be tracked in disk manager 206, and control may move to speculative I/O aggregator module 208. Speculative I/O aggregator module 208 may track all of the write requests on a particular SCM and corresponding virtual machine 202. Speculative I/O aggregator module 208 may create a new disk image for all of the write I/O happening on the virtual machine 202 and SCM DIMM 212 with metadata information (e.g., clock, uptime, state, virtual machine state, virtual machine ID, Delta Disk Image (DDI) policy, etc.).

5) Based on information from steps 1 to 4, disk manager 206 may create a DDI with characteristics such as:
   a. Most Recently Used (MRU) pages.
   b. Delta difference from SPD information
   c. Predictive behavior: (e.g. based on temperature, remaining lifespan, other health data, etc.)
   d. Block I/O write
   e. Block I/O write unchanged
   f. Block I/O resize/modify 6) Disk manager 206 may perform remapping of memory addresses from the above-defined characteristics which are more frequently used for block I/O to the newly created delta disk image, which may be located on less-used block regions (e.g., on a new or secondary SCM DIMM). Speculative I/O aggregator module 208 may hand over control to virtio_blk_handle_DDI_req for block completion.

7) Disk manager 206 may write delta disk image metadata information to a PCD location of new SCM DIMM.

8) All of the block I/O reads may be serviced from the combination of the original or "parent" SCM DIMM and the newly created delta disk image on the secondary SCM DIMM. For example, a data read may be accomplished by computing the XOR of the data on the parent SCM with the corresponding data on the delta disk image, and the result may be returned as the data that was read.

In some embodiments, an administrator or user of the information handling system may have the choice to merge the data from the delta disk image back into the parent disk image (e.g., based on meta-information stored in delta disk image). In other embodiments, the data from the delta disk image may be merged back into the parent disk image based on a cessation of intensive write I/O or any other suitable trigger. Such merging may be accomplished in some embodiments by XORing the data of the delta disk image with the data of the parent disk image and writing the results to the parent disk.

Figure 3:
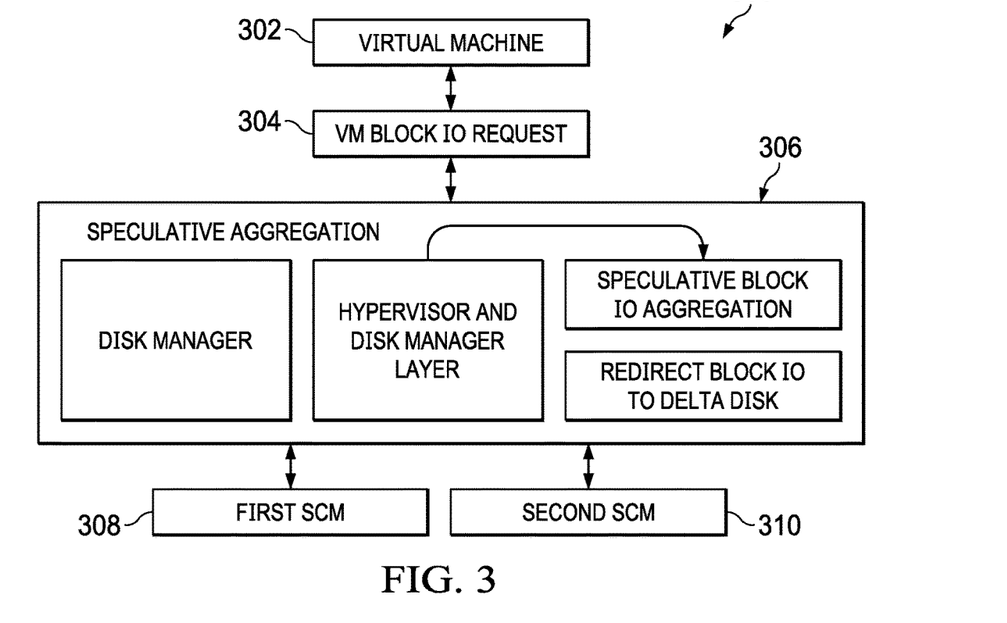
FIG. 3 illustrates a functional block diagram for speculative I/O aggregation, in accordance with embodiments of the present disclosure.

Turning now to FIG. 3, a block diagram of system 300 for speculative I/O aggregation is shown. System 300 may be used to implement all or a portion of the embodiment discussed above with reference to FIG. 2.

Virtual machine 302 may issue a VM block I/O request 304 to a hypervisor and a disk manager layer. The request is to be serviced by disk manager 306. Disk manager 306 may be configured to provide one or more virtualized storage resources to virtual machine 302, and may also implement a speculative block I/O aggregator module, as described above.

In this example, first SCM 308 may be known to have an excessive number of bad blocks, an uneven wear level, or some other indication of poor health data. In general, the speculative block I/O aggregator module may speculatively determine that the I/O should be directed elsewhere, e.g., based on an indication of potential SCM failure.

In response to a classification of the block I/O request as including an intensive write operation for first SCM 308, the speculative I/O aggregator module may create a delta disk image at second SCM 310. The intensive write and any future writes directed to first SCM 308 may be redirected to such delta disk image on second SCM 310. At some future time, the information stored in the delta disk image may be merged back into first SCM 308, as described above.

Figure 4:
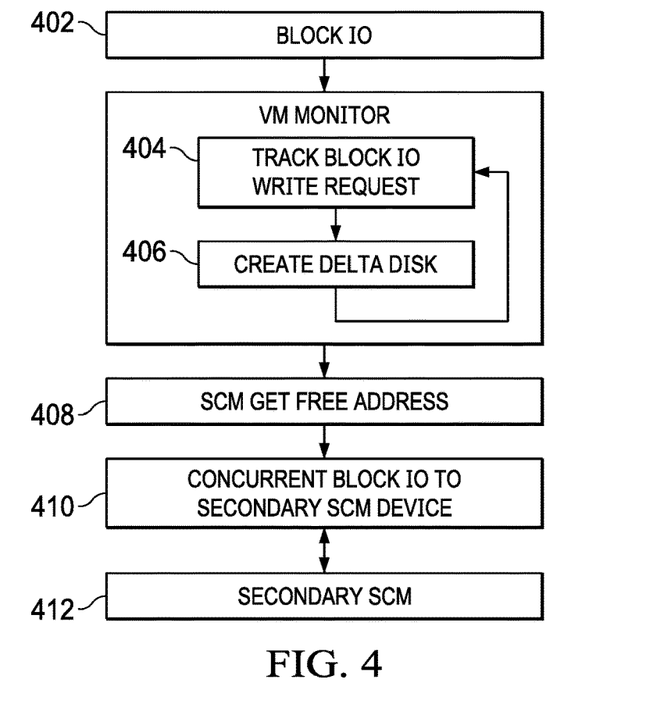
FIG. 4 illustrates a flow chart of an example method for use of a delta disk image, in accordance with embodiments of the present disclosure.

FIG. 4 illustrates a flow chart of an example method 400 for use of a delta disk image, in accordance with embodiments of the present disclosure. According to some embodiments, method 400 may begin at step 402. As noted above, teachings of the present disclosure may be implemented in a variety of configurations of information handling system 102. As such, the preferred initialization point for method 400 and the order of the steps comprising method 400 may depend on the implementation chosen.

At step 402, a block I/O job is requested. The block I/O job may include a block I/O write request. The block I/O job may be requested by a particular virtual machine operating on a hypervisor in some embodiments, and it may be directed to a primary SCM device.

At steps 404 and 406, a virtual machine monitor (which may implement a disk manager) may track the block I/O job and (if appropriate) trigger the creation of a delta disk image to receive the job.

At step 408, the disk manager may determine a free address range on a secondary SCM device to store the delta disk image. At step 410, the block I/O may be issued to the determined address range of the secondary SCM device, and at step 412, the block I/O may be committed to the secondary SCM device.

Although FIG. 4 discloses a particular number of steps to be taken with respect to method 400, method 400 may be executed with greater or fewer steps than those depicted in FIG. 4. In addition, although FIG. 4 discloses a certain order of steps to be taken with respect to method 400, the steps comprising method 400 may be completed in any suitable order.

Method 400 may be implemented using information handling system 102 or any other system operable to implement method 400. In certain embodiments, method 400 may be implemented partially or fully in software and/or firmware embodied in computer-readable media.

Various specific embodiments have been described in detail above. Such embodiments may solve some, all, or even none of the problems discussed with reference to existing systems. In particular, some embodiments may include a disk manager invoking a speculative I/O aggregation module to build a delta disk image for promoting even wearing of SCM DIMMs within a virtualized compute node.

In some embodiments, wear leveling, health data, and any other SPD information may be retrieved from any or all installed SCM DIMMs and provided to the disk manager for further activity for that compute node.

In some embodiments, slow and fast I/O operations from various virtual machines may be balanced in order to evenly wear level across all installed SCM DIMMs for that compute node.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   a processor;
   a memory communicatively coupled to the processor and comprising a plurality of physical storage resources; and a disk manager comprising a program of instructions, the disk manager configured to, when read and executed by the processor:
  receive a command to perform a block input/output (I/O) job at a first physical storage resource;
  based on characteristics of the block I/O job, classify the block I/O job as an intensive write, wherein the classification is based at least in part on a number of bytes or blocks to be written in the block I/O job being above a selected threshold, and wherein the selected threshold is based at least in part on a wear level of the first physical storage resource;
  in response to the block I/O job being classified as an intensive write, invoke a speculative I/O aggregator module of the disk manager;
  create a delta disk image for the first physical storage resource at a second physical storage resource; and
  redirect the block I/O job to the delta disk image at the second physical storage resource such that the block I/O job is applied to the second physical storage resource instead of the first physical storage resource.

2. The information handling system of claim 1, wherein the command to perform the block I/O job is received from a hypervisor executing on the information handling system.

3. The information handling system of claim 1, wherein the command to perform the block I/O job is received from a virtualized operating system executing on the information handling system.

4. The information handling system of claim 1, wherein the first and second physical storage resources comprise storage-class memory (SCM) dual in-line memory modules (DIMMs).

5. The information handling system of claim 1, further configured to determine at every power-on cycle of the information handling system, information regarding wear leveling, available space, and total capacity for the first and second physical storage resources.

6. The information handling system of claim 1, wherein the second physical storage resource is selected out of a plurality of potential second physical storage resources based on having a lowest wear level among the plurality of potential second physical storage resources.

7. The information handling system of claim 1, wherein the disk manager is further configured to:
  in response to a user command, merge the delta disk image with the first physical storage resource by committing changes from the delta disk image to the first physical storage resource.

8. The information handling system of claim 1, wherein the delta disk image is configured to store the redirected block I/O job as XORed data relative to data stored on the first physical storage resource.

9. A method comprising:
  receiving, at a disk manager of an information handling system, a command to perform a block input/output (I/O) job at a first physical storage resource of the information handling system;
  based on characteristics of the block I/O job, the disk manager classifying the block I/O job as an intensive write, wherein the classification is based at least in part on a number of bytes or blocks to be written in the block I/O job being above a selected threshold, and wherein the selected threshold is based at least in part on a wear level of the first physical storage resource;
  in response to the block I/O job being classified as an intensive write, the disk manager invoking a speculative I/O aggregator module;
  the disk manager creating a delta disk image for the first physical storage resource at a second physical storage resource; and
  the disk manager redirecting the block I/O job to the delta disk image at the second physical storage resource such that the block I/O job is applied to the second physical storage resource instead of the first physical storage resource.

10. The method of claim 9, further comprising:
  redirected at least one second block I/O job to the delta disk image at the second physical storage resource.

11. An article of manufacture comprising a non-transitory, computer-readable medium having computer-executable code thereon that is executable by a processor of an information handling system for implementing a disk manager configured to:
  receive a command to perform a block input/output (I/O) job at a first physical storage resource;
  based on characteristics of the block I/O job, classify the block I/O job as an intensive write, wherein the classification is based at least in part on a number of bytes or blocks to be written in the block I/O job being above a selected threshold, and wherein the selected threshold is based at least in part on a wear level of the first physical storage resource;
  in response to the block I/O job being classified as an intensive write, invoke a speculative I/O aggregator module of the disk manager;
  create a delta disk image for the first physical storage resource at a second physical storage resource; and
  redirect the block I/O job to the delta disk image at the second physical storage resource such that the block I/O job is applied to the second physical storage resource instead of the first physical storage resource.

12. The article of claim 11, wherein the command to perform the block I/O job is received from a hypervisor executing on the information handling system.

13. The article of claim 11, wherein the command to perform the block I/O job is received from a virtualized operating system executing on the information handling system.

14. The article of claim 11, wherein the first and second physical storage resources comprise storage-class memory (SCM) dual in-line memory modules (DIMMs).

15. The article of claim 11, wherein the processor is further configured to determine at every power-on cycle of the information handling system, information regarding wear leveling, available space, and total capacity for the first and second physical storage resources.

16. The article of claim 11, wherein the second physical storage resource is selected out of a plurality of potential second physical storage resources based on having a lowest wear level among the plurality of potential second physical storage resources.

17. The article of claim 11, wherein the disk manager is further configured to:
  in response to a user command, merge the delta disk image with the first physical storage resource by committing changes from the delta disk image to the first physical storage resource.

18. The article of claim 17, wherein the reconciling is performed in response to an indication that a wear level of the second physical storage resource has reached a threshold level.

* * * * *